(12) United States Patent
Thibault (10) Patent No.: US 7,661,685 B2
(45) Date of Patent: Feb. 16, 2010

(54) WHEELED MOBILE CADDY

(76) Inventor: Richard R. Thibault, 14252 Bournemuth, Shelby Township, MI (US) 48313

(*) Notice: Subject to any disclaimer, the term of this patent is extended or adjusted under 35 U.S.C. 154(b) by 112 days.

(21) Appl. No.: 11/469,923

(22) Filed: Sep. 5, 2006

(65) Prior Publication Data

US 2008/0054582 A1    Mar. 6, 2008

(51) Int. Cl.
B62B 11/00 (2006.01)
(52) U.S. Cl. ............... 280/47.35; 280/79.11; 280/79.2; 280/79.5
(58) Field of Classification Search ............... 280/32.5, 280/32.6, 79.2, 79.3, 79.5, 47.34, 47.35, 280/47.38, 87.01
See application file for complete search history.

(56) References Cited

U.S. PATENT DOCUMENTS

| | | | | | |
|---|---|---|---|---|---|
| 1,603,212 | A | * | 10/1926 | Raymond | 280/32.6 |
| 2,798,732 | A | * | 7/1957 | Craig | 280/641 |
| 2,840,384 | A | | 6/1958 | Bard | |
| 3,233,912 | A | * | 2/1966 | Chusid et al. | 280/33.995 |
| D222,951 | S | * | 2/1972 | Stringer | D12/425 |
| 4,179,153 | A | * | 12/1979 | Cole, Jr. | 296/37.1 |
| 4,240,684 | A | | 12/1980 | Henning | |
| 4,366,998 | A | | 1/1983 | Kaiser | |
| 4,373,761 | A | * | 2/1983 | Hansberry, Jr. | 312/249.12 |
| 4,449,322 | A | * | 5/1984 | Blumenthal | 446/71 |
| 4,458,963 | A | | 7/1984 | Keddie | |
| 4,550,828 | A | * | 11/1985 | Baldwin et al. | 206/349 |
| 4,763,907 | A | * | 8/1988 | Raymond | 280/47.35 |
| 4,993,551 | A | | 2/1991 | Lindsay | |
| 5,072,955 | A | * | 12/1991 | Holland et al. | 280/32.5 |
| 5,174,447 | A | | 12/1992 | Fleming | |
| 5,242,050 | A | * | 9/1993 | Billings | 206/315.11 |
| 5,275,281 | A | * | 1/1994 | Ebeling | 206/373 |
| 5,611,551 | A | * | 3/1997 | Lin | 280/32.5 |
| 5,615,902 | A | * | 4/1997 | Reurich | 280/47.18 |
| 5,722,118 | A | * | 3/1998 | Hansen et al. | 16/113.1 |
| 5,853,180 | A | * | 12/1998 | Taylor | 280/32.6 |
| 5,967,554 | A | | 10/1999 | Kanta | |
| 6,010,187 | A | * | 1/2000 | Dallas et al. | 297/188.08 |
| 6,027,128 | A | | 2/2000 | Stich et al. | |
| 6,138,827 | A | * | 10/2000 | Marshall | 206/373 |
| 6,315,310 | B1 | | 11/2001 | Hurt | |
| 6,425,590 | B1 | * | 7/2002 | Whiteside et al. | 280/32.6 |
| D463,124 | S | * | 9/2002 | Godshaw et al. | D3/318 |
| 6,520,513 | B2 | * | 2/2003 | Presley-Mays | 280/32.5 |
| 6,648,349 | B1 | * | 11/2003 | Waller et al. | 280/47.35 |
| 6,695,325 | B2 | | 2/2004 | Carrillo | |

(Continued)

*Primary Examiner*—Lesley Morris
*Assistant Examiner*—Vaughn T Coolman
(74) *Attorney, Agent, or Firm*—Van Ophem & Van Ophem, P.C.

(57) ABSTRACT

The invention is a combination mobile tool caddy and seat for performing work adapted for use by a tradesman such as an electrician, plumber, carpenter and the like. The wheeled mobile caddy includes a rigid frame having a lower and an upper support member vertically separated by upright corner members. The lower support member extends beyond the upper support member to form a platform area upon which a cylindrical vessel or bucket can be stored. The bucket is equipped with a liner having pockets for storing hand tools. Four caster wheels are appropriately attached to the lower support member so that the caddy can be wheeled from a service vehicle to a specific job site having stored therein the tradesman's tools, as well as necessary material supplies to perform daily job functions.

15 Claims, 6 Drawing Sheets

U.S. PATENT DOCUMENTS

| | | |
|---|---|---|
| 6,698,771 B1 | 3/2004 | Bergeron |
| 6,746,039 B2 | 6/2004 | Perelli et al. |
| 6,755,302 B1 * | 6/2004 | Streich et al. ............... 206/373 |
| 6,758,482 B2 * | 7/2004 | Stallbaumer ............ 280/47.27 |
| 6,857,644 B2 * | 2/2005 | Hsiao ........................ 280/79.2 |
| 6,877,828 B2 * | 4/2005 | Strong .................... 312/249.8 |
| 6,953,114 B2 * | 10/2005 | Wang ......................... 206/375 |
| 7,201,385 B2 * | 4/2007 | Renz et al. ............... 280/79.11 |
| 7,240,910 B2 * | 7/2007 | Stuemke .................... 280/79.5 |
| 7,306,245 B1 * | 12/2007 | Lowe ...................... 280/47.18 |
| 7,434,688 B2 * | 10/2008 | Hu .............................. 206/377 |
| 2002/0056967 A1 * | 5/2002 | Carrillo ................... 280/47.35 |
| 2003/0020249 A1 * | 1/2003 | Webster et al. ................ 280/43 |
| 2003/0227148 A1 * | 12/2003 | Shipman et al. .......... 280/47.34 |
| 2004/0232639 A1 * | 11/2004 | Chiappetta et al. ....... 280/47.34 |
| 2006/0066064 A1 * | 3/2006 | Hardy ....................... 280/79.2 |
| 2006/0208440 A1 * | 9/2006 | Clark et al. .............. 280/47.35 |

* cited by examiner

WHEELED MOBILE CADDY

CROSS REFERENCE TO RELATED APPLICATIONS

Not applicable.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to a service cart for skilled tradesmen. More particularly, the present invention relates to a wheeled, compartmentalized tool and hardware supply mobile caddy adapted to be used as a seat or support, as well as a mobile storage unit for conveying tools and hardware supplies to the job site and to make these readily accessible to the skilled tradesman to carry out the daily work activities.

2. Description of the Prior Art

The use of caddies, carts, or carriers for transporting tools, gardening implements or miscellaneous gear for pleasure or work performing activities is well known in the prior art. The crowded prior art is repleat with a myriad of designs which have been developed for countless specific objectives and requirements. For example, Keddie, U.S. Pat. No. 4,458,963 discloses a tool caddy stool that is carried by the user and is specifically made for sitting on or for standing on, as well as to store and carry tools so as to keep tools within easy reach during performance, repair, maintenance or construction of various tasks. Bergeron, U.S. Pat. No. 6,698,771 discloses a wheeled caddy for washing a vehicle which consists of a base assembly with a base member mounted on a wheel assembly carrying a support member which includes cleaning accessory holders, as well as a bucket at the top thereof to contain a vehicle washing liquid. Perelli et al., U.S. Pat. No. 6,746,039 teaches a dolly having multiple supports hingedly joined together to carry around containers, either one or two, for collecting trash, fluids or refuge. The joined assembly is capable of flexing between the containers and pulling one container onto a floor with a different elevation and is stable when maneuvering around corners and further provides the ability to rotate one platform with respect to an adjacent platform for storage purposes. Finally, Carrelli, U.S. Pat. No. 6,695,325 discloses a mobile paint caddy in the form of a multipurpose cart useful for transporting and supporting paint buckets, paint supplies such as brushes and rollers or an open paint can. In one embodiment of the mobile paint caddy, two pairs of suitable small diameter wheels extend below each end portion of the frame, and two pair of non-swivelable, larger diameter wheels extend below the central portion of the frame. A handle and the pair of larger diameter wheels enable the user to transmit a pivoting force to one end of the frame, whereupon the small diameter wheels adjacent thereto are driven into engagement with the ground and the large diameter wheels at the other end of the frame are lifted out of contact with the ground surface.

The efficiency of mobile skilled trade and service personnel has been severely hampered due to problems associated with the transportation of essential tools and material supplies from a van or service vehicle to the point at the job site where they are needed. Although most tradesmen have shelving, drawers or drawer units within or about the vehicle so as to organize their tools and materials, which permits the tradesman to transport their tools to the job site, once on the job site, the tradesman must physically carry the tools from the vehicle to the actual working area. Also, with respect to a mechanic or especially a home handyman who contemplate doing home repairs, maintenance or construction work on objects in the home or other sites discover that the project requires some tools and hardware other than what they are able to carry at one time to the work place. The traditional and probably the only suitable response to this situation is to make several trips back and forth to a tool and hardware storage place such as a garage, a basement or a truck parked on the street to get those items which they unexpectedly needed. Such conduct creates fatigue and obviously in terms of a tradesman, adds to the cost of a project as a result of the inefficiency related thereto. Numerous toolboxes, chests, racks and the like have been proposed to utilize for carrying different types of tools. Some workers, especially mechanics, require easy and convenient access to large numbers of relatively small tools. Others, such as tradesmen, require a limited number of tools but require a rather large supply of miscellaneous parts specific to the activity such as electricians and plumbers but have no convenient way to convey these from their service vehicle to the actual job site. Furthermore, as most tradesmen or home mechanics have discovered, the site of an installation, repair or maintenance activity is never situated at a level at which it is comfortable to do the work. Sometimes, the site is low so squatting to work on it seems desirable. In such cases, when after working at such a level, the worker decides to stand upright, his knees inform him that squatting for a long time was indeed undesirable.

BRIEF SUMMARY OF THE INVENTION

The invention is a product designed for mitigating the problems and unpleasantness set forth above. In particular, the invention is a wheeled mobile caddy or carrier which has many advantages over a wheeled or non-wheeled toolbox, rack or service cart and is particularly useful for tradesmen, repairmen or home mechanics, which is not anticipated or rendered obvious or even implied by any of the prior art, either alone or in combination thereof.

The present invention consists of a wheeled support frame having lower and upper support members. The lower support member extends beyond the upper support member sufficiently to provide a platform upon which is located a conventional cylindrically shaped bucket. To the bucket is mounted a sturdy, heavy cloth, canvas or leather liner material amenable to completely circumferentially line the bucket outside and/or inside surface. The liner drapes downwardly over the upper rim and conforms to the surfaces of the inside of the bucket and of the outer surface of the bucket. The liner includes pockets stitched to the panel to form a plurality of inner pockets opening toward the inside of the bucket, as well as a plurality of outer pockets to drape on the outside surface of the bucket, again, stitched to the panel to form pockets for containing and storing a variety of small tools. The pockets may be selected of different sizes and depth to enable the storage of various size and types of tools. Generally, provisions are made to maintain the liner to the bucket by either form fitting it thereto or providing a means for tying the liner to the bucket so as to secure the liner to the bucket during use of the wheeled mobile caddy. Many different such bucket tool carriers are currently available in the prior art. It is the intent of the invention to provide the type of tool carrier which would be directly related to the tradesman's activity and to enable carrying the type of tools used by the tradesman in performing his or her daily work functions. Further, for a home handyman, a general type carrier may be used to provide easy storage of a miscellaneous variety of tools which can be used in performing the repair, maintenance, or home improvement functions typically accomplished by the home handyman.

The wheeled mobile caddy further includes on its lower support member a variety of compartments, the smaller of which surrounds a larger compartment in the center of the platform or support member. The center section is intended to be used for storage and/or conveyance of power tools generally related to the tradesman's specific work activity. For example, drills, augers, power screw drivers, small hand saws, automatic nailers and the like. Surrounding the central compartment, are a plurality of smaller compartments for purposes of storing either small tools or miscellaneous hardware supplies related to the tradesman's or handyman's activities. For example, provisions are made to store up to four containers of liquid propellant, i.e., lubricants, cleaners, and the like.

The upper support member is securely attached to the lower support member by a plurality of upright corner brace members and provides a seat for the user, handyman or tradesman's wheeled mobile caddy. A handle is attached to the upper support member so that the wheeled mobile caddy can be conveniently moved about. The handle is mounted on an extended portion of the upper support member so that when released it will hang straight down along the front surface of the lower and upper support members of the wheeled mobile caddy. Further, the handle is pivotably attached to the upper member so as to not extend beyond the top portion of the upper support member to avoid interference with the seating function. Four wheels mounted to the bottom support member provide the mobility to allow the wheeled mobile caddy to be conveniently moved from one work site to another or from the handyman's garage or tradesman's vehicle to the work site. The wheeled mobile caddy allows for convenient arrangement and, hence, quick and easy access and restoration of articles that it carries. Most importantly, it increases the probability that the worker will bring all the tools and hardware supplies necessary to do most tasks to the job site in a single trip.

Although the bucket may be used to carry tools using a form fitting liner, it is also intended to be a container to carry material supplies such as electrical plugs and switches, circuit breakers, tape, wire nuts, buchanan caps, plumbing fixtures, copper pipe, and related couplers and connectors. Further, the upper support seating area could be used to transport coiled flex cable or lighting fixtures to the actual work site where it can be downloaded so that the wheeled mobile caddy may be used as a seat for the user while performing the work assignment.

The primary object of the present invention is to provide a wheeled mobile caddy for use by tradesmen, homeowners, gardeners, mechanics or technicians as a wheeled mobile caddy or carrier, to convey tools and material supplies to and from the work site. Additionally, it is an object that the wheeled mobile caddy may perform as a portable tool holder and material supply holder while providing a seating position for the user while performing work. The combination provides maximum flexibility in use; furnishing significant degrees of freedom of motion and mobility, with the bucket or vessel being transportable on the wheeled carrier or alternatively lifted and carried by the bucket handle. The bucket additionally is readily storable on the wheeled mobile caddy and can easily be removed from the wheeled carrier. When equipped with the tool holder attachment, the attachment is in turn readily set in place and/or removed from the hollow open top bucket positioned on the wheeled mobile caddy.

A further object of the present invention is to provide an improved mobile support for conveniently and reliably retaining a bucket on a mobile carrier, such as a wheeled mobile caddy, with the combination further providing a convenient means for alternate ways of carrying and transporting tools and material supplies, as well as for storing of same, so as to be accessible and with in easy reach of a tradesman seated on the wheeled mobile caddy while performing his job. The combination may be employed for carrying hand tools, power tools and material supplies to and from a job site and for maintaining the tools in an orderly and accessible fashion and permitting their access by the user while seated on the wheeled mobile caddy.

It is a further object of the invention to provide a combination wheeled mobile tool and supply carrier and seating device which may be efficiently used by a tradesman, mechanic, gardener and/or homeowner.

It is yet a further object of the invention to provide a combination wheeled mobile tool and material supply carrier and seating device which is rugged, durable and ideally adapted to store tools of a tradesman in an orderly fashion.

It is still a further object of the invention to provide a combination wheeled mobile tool and material supply carrier which may be conveniently employed as a seat for the user while performing the specific work objective.

It is yet a further object of the invention to provide a combination wheeled mobile tool and material supply carrier wherein tools are readily accessible to the user while functioning simultaneously as a seat.

It is a further object of the invention to provide a combination wheeled mobile tool and material supply carrier which is simple and of sturdy construction, while also being lightweight and easy to transport to a job site.

It is still a further object of the invention to provide a combination tool and material supply carrier and mobile seat for performing the tradesman's tasks and having tools and supplies readily accessible by the user while in a seated position on the wheeled mobile caddy.

Other advantages and features of the present invention will become more apparent from the following detailed description when read in conjunction with the accompanying drawings and claims.

DETAILED DESCRIPTION OF THE PREFERRED EMBODIMENT

Referring now to the drawings, in particular to FIGS. 1-7, a first preferred embodiment of the wheeled mobile caddy 10 of the present invention is shown therein.

Figure 8:
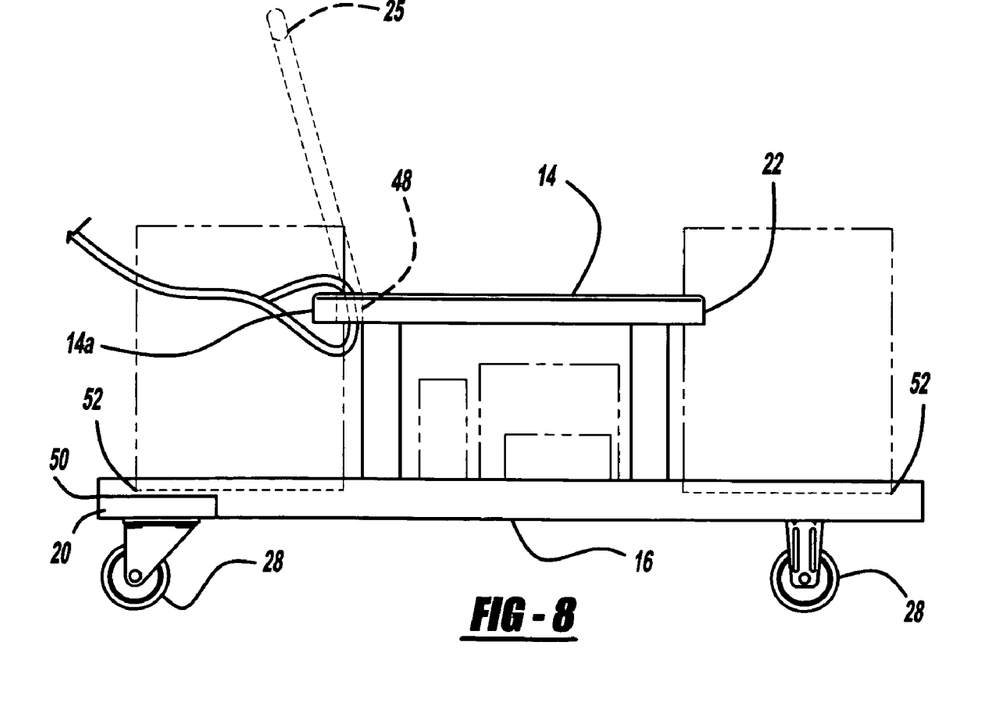
FIG. 8 is another embodiment of the invention which shows the extension of the lower support member so as to enable the carrying of two buckets while at the same time providing a rope at the front thereof to enable the wheeled carrier to be towed without the handle interfering with the either bucket.

The first preferred embodiment is equipped with storage areas specifically sized for an electrician's tools, equipment and supplies. The wheeled mobile caddy shown generally at 10 includes a support frame 12 which is generally rectangular in shape and adapted to transport one or more generally cylindrical buckets such as the two shown in phantom line in FIG. 8. The support frame 12 consists of a molded polymeric material so as to reduce the weight of the overall assembly, the cost of the assembly and to enable the wheeled mobile caddy 10 to be configured and marketed for use by tradesmen, mechanics, home handymen and the like. The material selected would be resistant to attack from cleaning fluids and solvents to enable the user to clean the wheeled mobile caddy 10 after use. The wheeled mobile caddy 10 is a combination vessel/carrier in the form of at least one bucket, and a hand tool storage unit for conveying tools and hardware supplies to the job site so as to make these readily accessible to the journeymen to perform their daily work activities. The wheeled mobile caddy 10 also provides a seat in the form of an upper support member 14 so that a user can perform work in a seated position, which also can be used to convey material supplies from the service vehicle to the job site.

The support frame 12 has an upper support member 14, as well as a lower support member 16 spaced from the upper support member 14 and attached securely to vertical corner uprights 18 proximate the four corners thereof. The lower support member 16 has an upper surface 17 that has at its rearward end a platform 20 extending beyond the rearward end 22 of the upper support member 14. A forward end 14a of the upper support member 14 extends beyond the forward end 16a of the lower support member 16 for reasons to be described hereinafter. The forward end 14a of the upper support member 14 has an extended portion 24 whereat, at the center thereof, is pivotally connected a molded handle member 25, for pivotal movement about a transverse horizontal pivot pin 26 mounted across a central cut out 27 in the extended portion 24 of the upper support member 14 of the wheeled mobile caddy 10 as is clearly illustrated in FIG. 6. The molded handle member 25 attached about the transverse horizontal pivot pin 26 within the central cutout 27 of the upper support member 14 without interference with the forward end 14a of the upper support member 14 so that when released by the user, the molded handle member 25 will pivot to hang in a straight down position against the forward end 16a of the lower support member 16 and not extend beyond the top surface of the upper support member 14 to avoid interference with the seating function, as shown in hidden line in FIG. 3. A pivoting axis for the molded handle member 25 is arranged in the extended support portion 24 of the upper support member 14 to enable the molded handle member 25, when not in use, to be flush with the seat portion, as well as rest against the front surface of the forward end 16a portion of the lower support member 16.

Four caster wheels 28 are attached to the lower support member 16 of the support frame 12 proximate the four corners thereof. The caster wheels 28 are alike and have their respective ground engaging surfaces spaced a distance from the bottom end of the support frame 12 so as to be generally co-planar with one another, each caster wheel 28 is adapted to swivel and permit rotational motion, as well as longitudinal movement of the wheeled mobile caddy 10. Alternatively, it is conceivable to use a straight through independent axle (not shown) on the rear wheels with only caster wheels 28 at the front of the wheeled mobile caddy 10. Such arrangement will permit uni-directional or 360 degree rotation of each front wheel structure on the plane of contact with the ground surface. Alternatively, the caster wheels 28 may be mounted on a single axle which runs horizontal to the ground from one side of the wheeled mobile caddy 10 to the opposite side thereof. Preferably, however the configuration shown in the figures commonly known as a caster wheel assembly is preferred.

As earlier discussed, the support frame 12 further includes a generally horizontal lower support member 16 which extends rearwardly of the upper support member 14 while also being generally horizontally disposed. In use, the rearward end portion of the platform 20 of the lower support member 16 is intended to provide a platform 20 with a recessed diameter 52 in which is located a conventional cylindrically shaped bucket 29. Attached to the bucket 29 is mounted a sturdy, heavy fabric, cannabis or leather liner material 30 amiable to completely circumferentially line the bucket 29 outside and/or inside surfaces. The liner 30 drapes downwardly over the upper rim 32 of the bucket 29 to conform to the surfaces of either or both of the inside of the bucket 29 or the outer surface of the bucket 29. Some users may prefer just to line the outside of the bucket 29 so as to provide a liner 30 attached to the outside surface of the bucket 29 which includes pockets 34 stitched to the liner 30 to form a plurality of outer pockets opening towards the outside of the bucket 29. Alternatively or in addition thereto, the same liner 30 may include pockets 36 stitched to the inner panel of the liner 30 so as to form a plurality of inner pockets 36 opening toward the inside of the bucket 29. The purpose of the pockets 34, 36 is to provide various formed and sized pockets 34, 36 for containing and/or storing a variety of smaller tools 38. The pockets 34, 36 may be selected of different sizes and depths to enable the storage of the various size and types of smaller tools 38. Generally, appropriate arrangements are provided to maintain the liner 30 to the bucket 29 by either form fitting it thereto or providing a means for tying the liner 30 to the bucket 29 so as to secure the liner 30 to the bucket 29 during use on the wheeled mobile caddy 10. Many different such tool carriers or buckets 29 are currently available in the prior art. It is the intent of the invention to provide the type of tool carrier/bucket 29 which would be directly related to the tradesman's activity and the type of tools used by the tradesman in performing his other daily work functions. Further, for use by a home handyman, a general type liner 30 may be used to provide easy storage of a variety of smaller tools 38 which can be used in performing repair, maintenance or home improvement functions typically accomplished by the home handyman.

To accommodate the bucket 29 on the rearward end of the platform 20 of the lower support member 16, the rearward end 22 of the upper support member 14 is scalloped 40 so as to provide a clearance to permit the bucket 29 to be seated in the recessed diameter 52 of the platform 20 on the lower support member 16. A further use of the bucket 29 is to provide a container to the journeyman to carry miscellaneous material supplies to and from the work site, as well as provide storage of a plurality of smaller tools 38 in the various pockets 34, 36 of the liner 30 attached to the outer surface of the bucket 29 so as to be readily accessible during work activities.

The wheeled mobile caddy 10 further includes on its lower support member 16 a variety of compartments, the smaller of which surrounds a larger compartment 44 in the center of the lower support member 16. The larger compartment 44 has a compartment floor or bottom surface 45 which is intended to be used for storage and/or conveyance of power tools generally related to the tradesman's specific activity. For example, drills, augers, power screw drivers, small hand saws, automatic nailers and the like. Surrounding the larger compartment 44 is a plurality of smaller compartments 44a, 44b, 44c and 44d shown in hidden line in FIG. 6, for purposes of storing either small tools or miscellaneous hardware supplies related to the tradesman's or handyman's activities. For example, provisions are made to store up to four containers of liquid propellant 46, i.e. lubricants, cleaners and the like.

Figure 2:
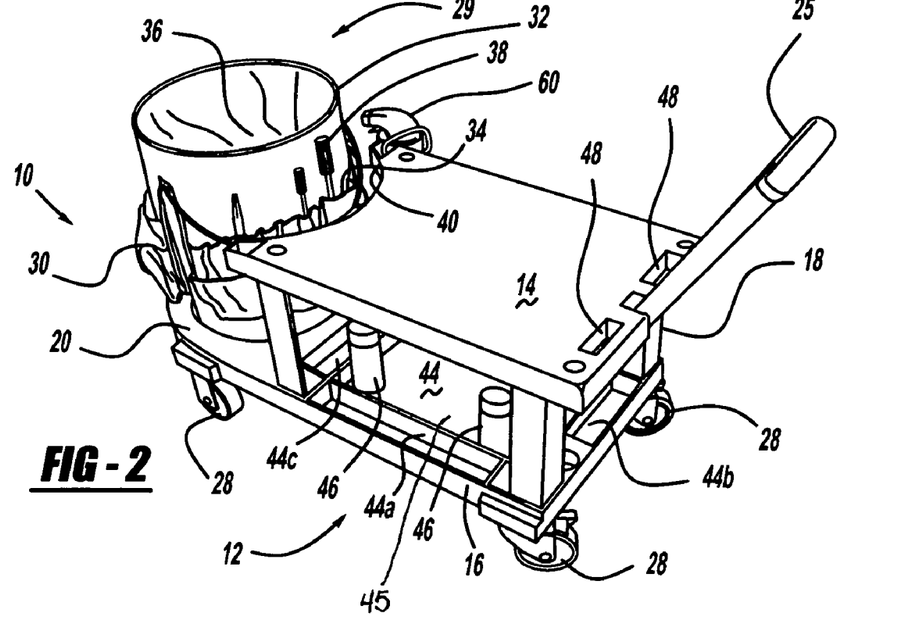
FIG. 2 is a perspective representation of the wheeled mobile caddy with the bucket in place at the rear portion thereof.
Figure 3:
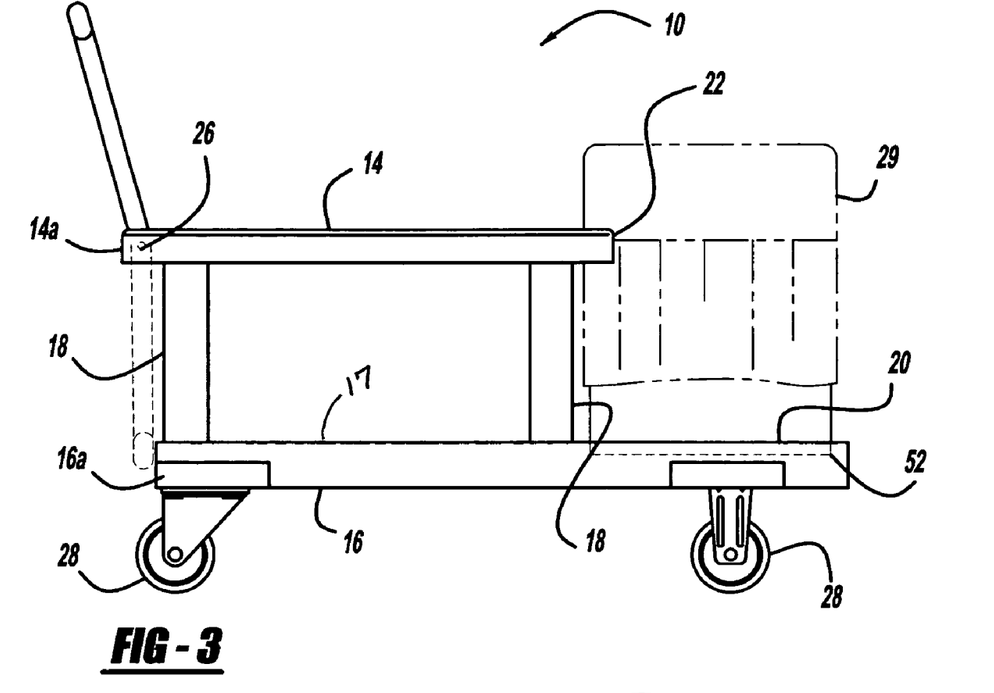
FIG. 3 is a side elevational view of the wheeled mobile caddy with the bucket shown in hyphen outline at the rear thereof and the handle in the towing, as well as rest positions.
Figure 4:
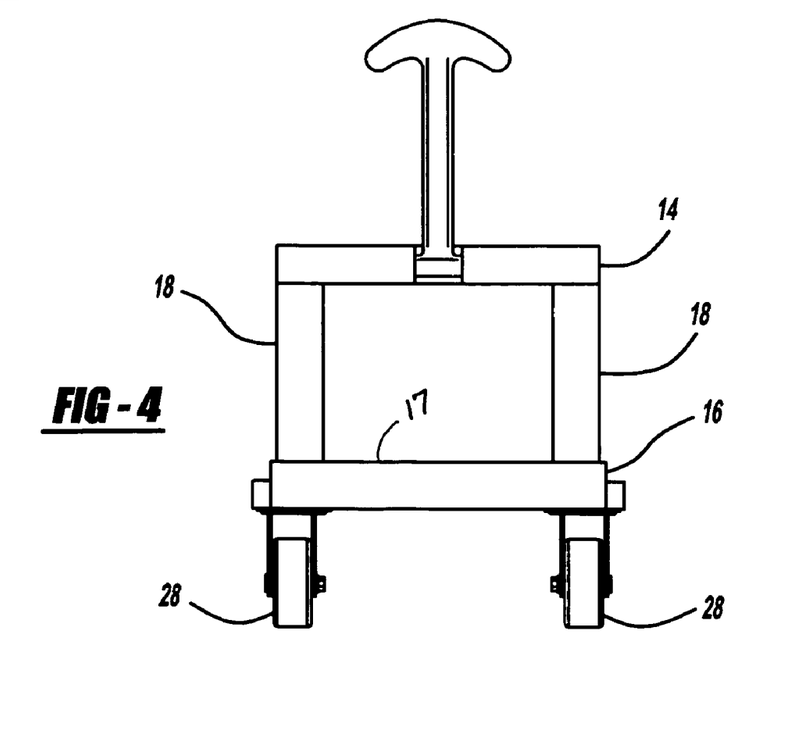
FIG. 4 is a side view from the forward end of the wheeled carrier with a handle shown in a raised position.
Figure 5:
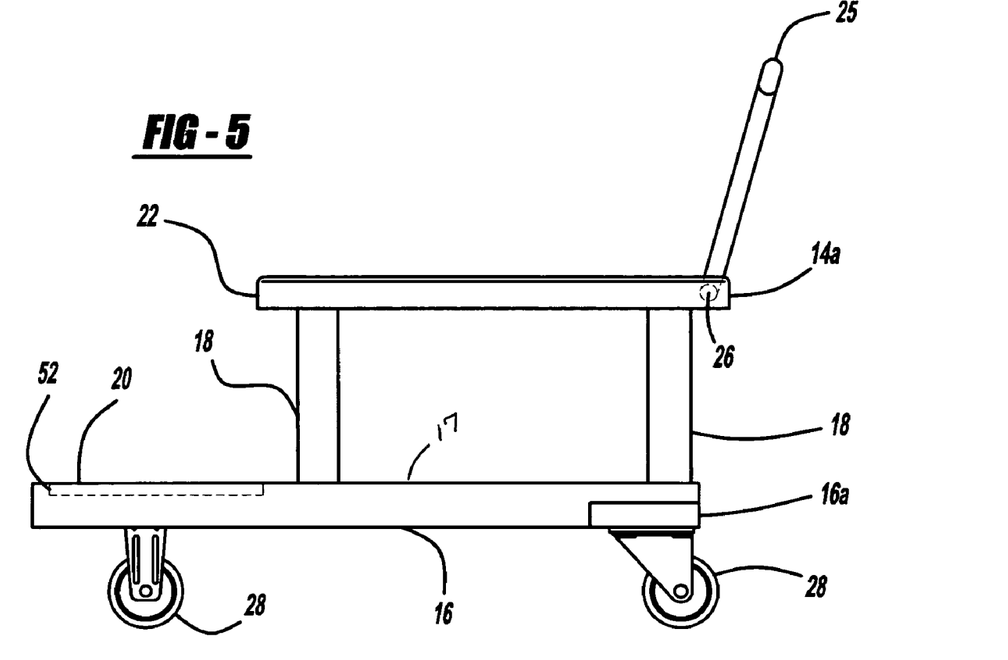
FIG. 5 is a side elevational view of the wheeled carrier with the bucket removed from the lower support member and the handle in a raised position.
Figure 6:
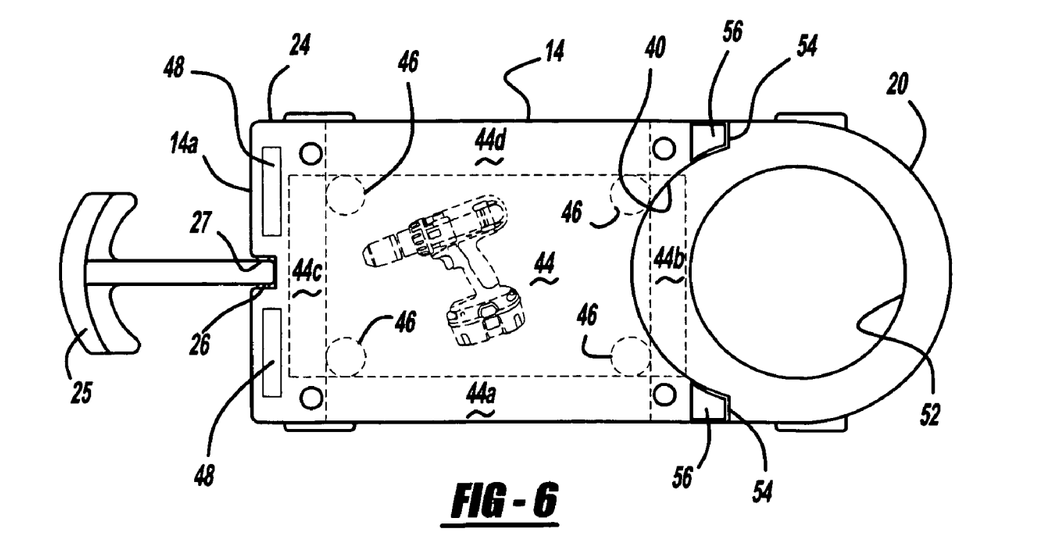
FIG. 6 is a top view of FIG. 3 with the compartments along the lower support member shown in hidden line.
Figure 7:
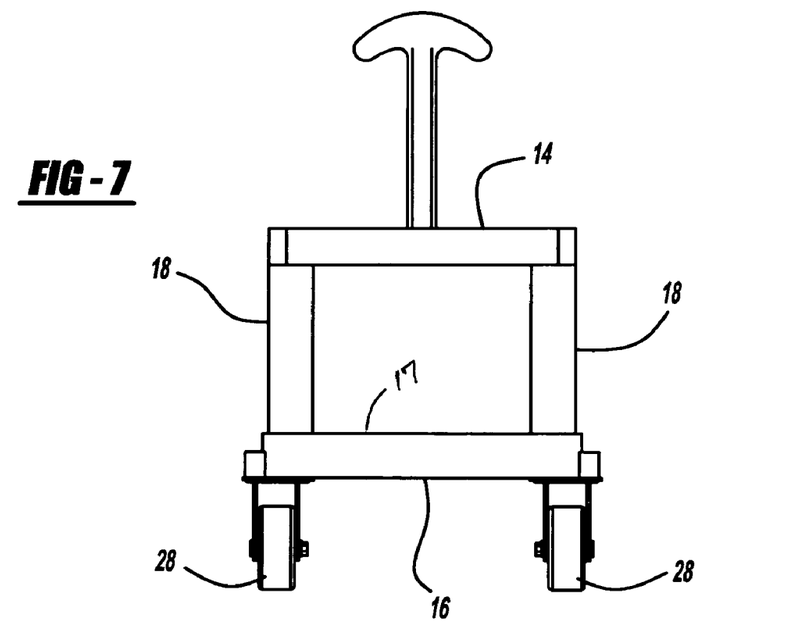
FIG. 7 is an end view of FIG. 3.

As shown in FIG. 6, the extended portion 24 of the upper support member 14 at the forward end 14a thereof, has two slots 48, one on either side of the center cutout 27 wherein a molded handle member 25 is mounted. The purpose of the slots 48 is to provide, as shown in the alternative embodiment of FIG. 8, a means for conveying the wheeled mobile caddy 10 when two buckets 29 are used. In this alternate embodiment, a forward platform 50 is obtained by extending the lower support member 16 beyond the extended portion 24 of the forward end 14a of the upper support member 14. This forward platform 50 also has a recessed diameter 52 in which a standard bucket like 29 can be placed. Again, the bucket may or may not incorporate a liner, like liner 30 to store additional smaller tools 38. The additional bucket may also be used to store material supplies necessary for the specific work function intended to be performed. This alternate embodiment also serves to provide a seat for the user on the upper support member 14 from which all tools and/or material supplies are easily accessible to the user while performing his typical work function. The slots 48 allow the user to tie a rope to the forward end 14a of the extended portion 24 so that the wheeled mobile caddy 10 can be towed with a rope rather than a molded handle member 25 since a molded handle member 25 attached to the upper support member 14 would interfere with the bucket 29 located on the forward platform 50. Further, the rearward end 22 of the upper support member 14 is truncated 54 near the bucket 29 and also includes a compartment 56 on each side thereof which may be used for purposes of storing either tools or other material supplies which adapt to these compartments 56. FIG. 2 illustrates how a spray bottle 60 containing fluid can be hooked onto the compartment 56 wall to store same thereat.

Figure 1:
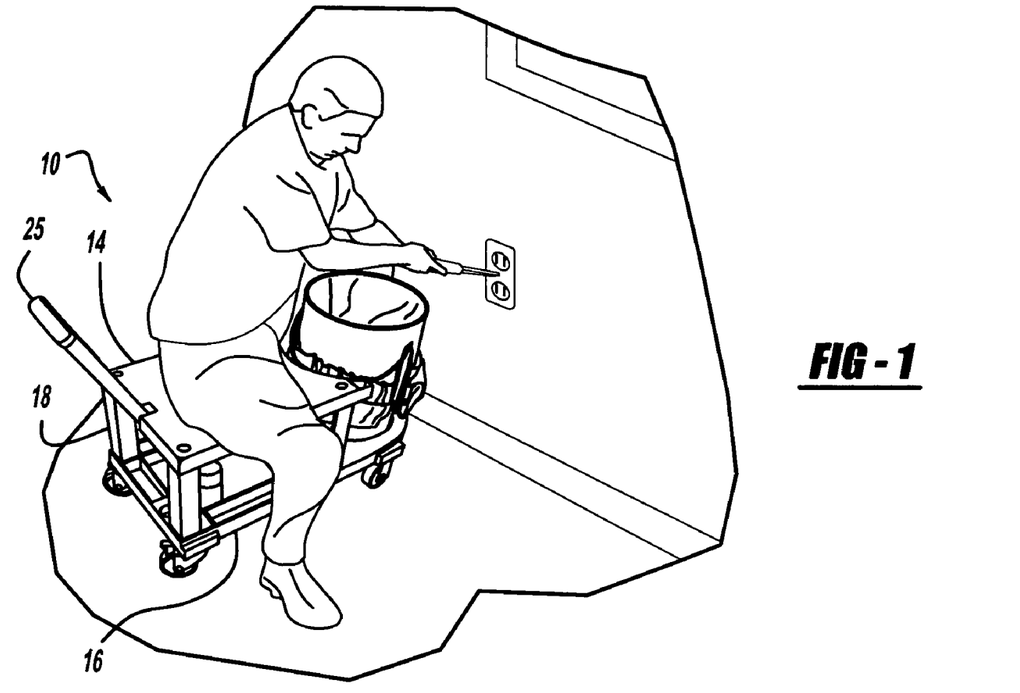
FIG. 1 is a perspective drawing of the invention in use by an electrician to repair an electrical wall fixture.
Figure 9:
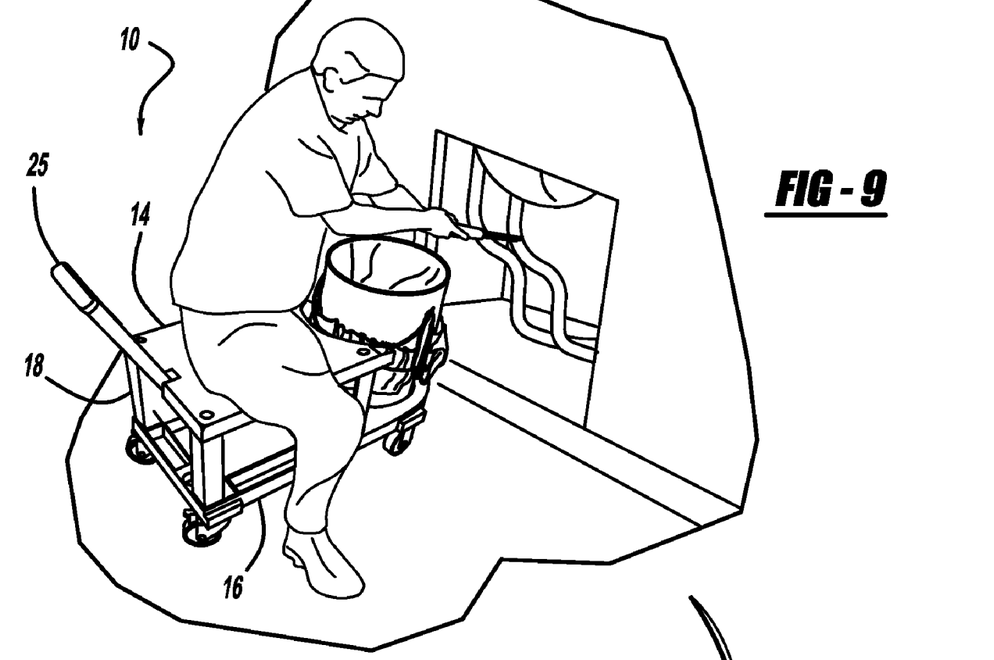
FIG. 9 illustrates the invention in use by a plumber seated thereon and within convenient reach of all of the tools, as well as material supplies related to the plumber's work activities.
Figure 10:
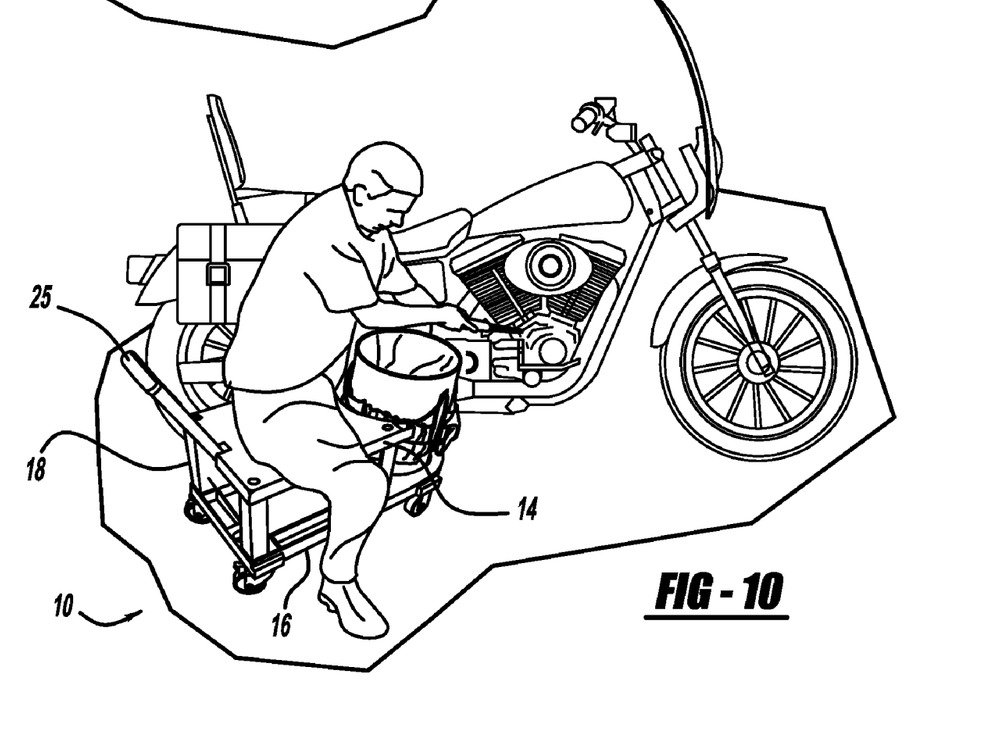
FIG. 10 illustrates the use of the bucket for detailing a motorcycle or performing repair or maintenance work on a motorcycle, with the user's tools being easily within reach.
Figure 11:
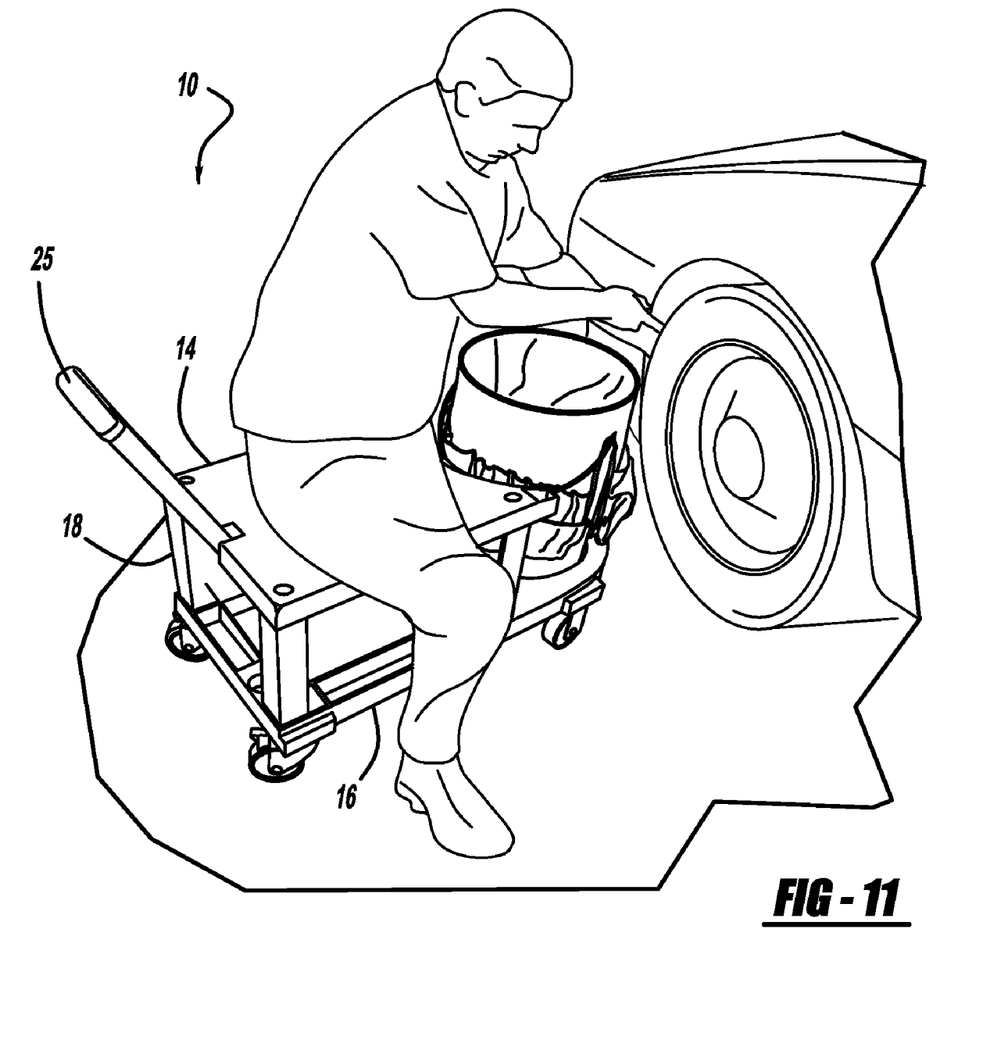
FIG. 11 also illustrates the use of the invention in conjunction with detailing a motor vehicle.

As recited hereinabove, the arrangement of the present invention consists of a wheeled support frame to enable carrying the type of tools and material supplies used by a tradesman in the performance of his daily work functions. Further, the invention contemplates having sufficient storage capacity for the material supplies needed in conjunction with the tradesman's daily work activities. Such is facilitated by the use of a wheeled mobile caddy 10 having a bucket 29 located on a platform 20 of the lower support member 16, which is also adapted to accommodate a variety of conventional tools used by the tradesman. FIG. 1, as well as FIGS. 9-10 illustrate various applications of the wheeled mobile caddy 10 in conjunction with electricians, plumbers, home handyman, maintenance and repairmen. The wheeled mobile caddy 10 is particularly well suited for use in motorcycle or automotive vehicle detailing work, or light mechanic work associated with motorcycles or car chassis work, i.e. wheels, brakes, etc. In such case, the seating aspect of the wheeled mobile caddy 10 is especially convenient for carrying out the tasks to be performed. The wheeled mobile caddy 10 is provided with a tool carrying and material supply capability so that a handyman, journeyman, or mechanic when seated, is able to perform the work in a seated position while having easy access to all tools and material supplies needed in order to complete the work activity. Further, the bucket 29 is easily removable from the wheeled mobile caddy 10 as necessary, it can be carried to a job function with the necessary tools and material supplies therein to perform this function, yet is able to be transported on the wheeled mobile caddy 10 to and from the journeyman's vehicle to obtain additional appropriate supplies.

Thus, the present invention may be utilized to store a variety of tools and material supplies commonly used in the building trades. It will be apparent that when the bucket 29 is stored on the wheeled mobile caddy 10, it's relatively broad lower support member 16 will maintain stability and present a low center of gravity so that users seated on the device may simultaneously have access to all of the tools stored therein, as well as the material supplies stored therein for the purpose of completing the necessary work function.

From the foregoing, it will be seen that the invention is one well adapted to obtain all the objects herein set forth, together with other advantages which are obvious and which are inherent to the structure.

It will be understood that certain features and sub-combinations are of utility and may be employed without reference to other features and sub-combinations. This is contemplated by and well within the scope of the claims. Although several embodiments have been shown in the drawings, many other embodiments may be made of the invention without departing from the scope thereof. For example, the wheeled mobile caddy 10 could be lengthened in the longitudinal direction by increasing the length of the platform 20 with an added set of caster wheels 28 so that the second bucket 29 can be provided on the platform 20. This would allow the use of the molded handle member 25 with a two bucket 29 wheeled mobile caddy 10. It is to be understood that all matter herein set forth shown in the accompanying drawings is to be interpreted as illustrated and not in a limiting sense.

What is claimed is:

1. A multipurpose tradesman's wheeled caddy, said wheeled caddy comprising:
   a frame member having
      an upper support member; and
      a lower support member having an upper surface and a bottom surface;
   means for supporting said frame member for rolling movement on a ground surface, said support means mounted to said lower support member;
   tools and equipment supplies storage means mounted to said frame member, said tools and equipment supplies storage means further comprising:
      upright support means mounted between said upper support member and lower support member so as to create an open space between said upper support member and said lower support member;

means integral with said lower support member for extending said lower support member having said upper surface beyond said upper support member to create an extended platform member, said platform member having a bottom surface; said upper surface of said platform member defining a recessed compartment having a compartment floor located between said upper surface and said bottom surface of said lower support member;

a plurality of storage compartments formed in said upper surface of said lower support member beneath said upper support member to provide for storage of one of said tools and equipment supplies, said plurality of storage compartments having a compartment floor defining a bottom surface located between said upper surface and said bottom surface of said lower support member; and a container removably mounted on said compartment floor of said recessed compartment in said upper surface of said platform member for providing additional storage for one of said tools and equipment supplies; and means for seating complementary with said upper support member whereby a tradesman seated on said means for seating may conveniently access tools and supplies stored in said open space beneath said upper support member and said container mounted on said platform member to perform a specified work activity and store said tools in one of said storage compartment means and container located in said recessed compartment of said platform member, while seated, and remain seated to complete a specified work activity without undue effort so as to avoid back discomfort, and further whereby said supporting means provides rolling movement of said wheeled caddy such that said seated tradesman can easily propel said wheeled caddy along a level surface with his legs and remain seated while rolling along said level surface.

2. The multipurpose tradesman's wheeled caddy as claimed in claim 1, wherein said upright support means further comprises at least two upright support members mounted between said upper and lower support members at opposing ends of said upper support member.

3. The multipurpose tradesman's wheeled caddy as claimed in claim 1, wherein said upright support means further comprises a plurality of upright support members mounted between said upper support member and said lower support member whereby said upper and lower support members are spaced a predetermined distance apart.

4. The multipurpose tradesman's wheeled caddy as claimed in claim 1, wherein said means for supporting said frame member further comprises a plurality of wheels dispersed underneath said lower support member for conveying said frame on a ground surface.

5. The multipurpose tradesman's wheeled caddy as claimed in claim 1, further comprising a pivotable handle removably attached to said upper support member for easily conveying said wheeled caddy on a ground surface.

6. A multipurpose tradesman's wheeled caddy, said wheeled caddy comprising:

a support frame having
  a lower support member having
    a forward end;
    an opposite rearward end;
    an upper support surface; and
    a bottom surface;
  an upper support member having a forward end and an opposite rearward end; and
  one of said forward end and rearward end of said lower support member having a support portion extending beyond said respective one of said forward end and rearward end of said upper support member to define a platform member having an upper surface and a bottom surface, said platform member defining a recessed compartment having a compartment floor located between said upper surface and said bottom surface of said lower support member for receiving a container therein;

means for mounting said upper support member in spaced relation at a location above said lower support member, said mounting means defining an open space between said upper and lower support members, said upper support member having a means for seating integral therewith and adapted to support a seated user thereon;

means for creating a storage compartment mounted to said lower support member beneath said upper support member in said open space between said upper and lower support members for tool and equipment supplies, said means for creating a storage compartment having a compartment floor defining a bottom surface located between said bottom surface and said upper surface of said lower support member; and a container removably mounted on said compartment floor of said recessed compartment in said upper surface of said platform member for providing additional storage for said tool and equipment supplies;

means for supporting said support frame for rolling movement on a ground surface whereby a user seated on said means for seating may access the necessary tools and supplies to perform a specified work activity and store said tools and/or supplies in said open space between said upper and lower support frame for easy access, while seated, and complete said specified work activity without the need of assuming an uncomfortable work position such as squatting or bending to prevent back injury, and further whereby said supporting means provides rolling movement of said wheeled caddy such that said seated tradesman can easily propel said wheeled caddy along a level surface with his legs and remain seated while rolling along said level surface.

7. The multipurpose tradesman's wheeled caddy as claimed in claim 6, wherein said means for mounting further comprises at least two upright support members mounted between said upper and lower support members at opposing ends of said upper support member.

8. The multipurpose tradesman's wheeled caddy as claimed in claim 6, wherein said means for supporting said support frame further comprises a plurality of wheels dispersed underneath said lower support member for conveying said support frame on a ground surface.

9. The multipurpose tradesman's wheeled caddy as claimed in claim 6, further comprising a centrally dispersed handle removably attached to said upper support member for easily conveying said wheeled caddy on a ground surface.

10. The multipurpose tradesman's wheeled caddy as claimed in claim 6, wherein said means for mounting further comprises a plurality of upright support members mounted between said upper support member and said lower support member whereby said upper and lower support members are spaced a predetermined distance apart.

11. A multipurpose tradesman's wheeled caddy, said wheeled caddy comprising:

an upper support platform member having one end and an opposite end;

a lower support platform member having one end and an opposition end mounted in spaced relation below said upper support platform member, said lower support platform member further having an upper surface and a bottom surface;

means for coupling said upper support platform member to said lower support platform member, said coupling means defining an open space between said upper support platform member and said lower support platform member;

said opposite end of said lower support platform extending beyond said opposite end of said upper support platform to define a platform end for receiving a removable container, said platform end having a recessed compartment in said upper surface of said lower support platform, said recessed compartment having a compartment floor located between said upper surface and said bottom surface of said lower support platform member;

a plurality of storage compartments formed in said upper surface of said lower support platform member beneath said upper support platform member for storing tools and supplies used by said tradesman in performing selected work activities, said plurality of compartments having a compartment floor defining a bottom surface located between said upper surface and said bottom surface of said lower support platform member, said plurality of storage compartments having at least one centrally located compartment in said open space between said upper and lower support platform members and the remainder of said plurality of compartments surrounding said at least one centrally located compartment;

a container removably mounted on said compartment floor of said recessed compartment in said platform end of said lower support platform member for providing additional storage for said tools and supplies used by said tradesman in performing selected work activities;

means for supporting said lower support platform member for roller movement on a ground surface, said support means mounted to said lower support platform member; and means for seating complimentary with said upper support platform member whereby a tradesman seated on said seating means may conveniently access tools and supplies stored in said open space beneath said upper support member and said container mounted in said recessed compartment to perform specified work activity and store said tools in one of said plurality of storage compartments and said container located in said recessed compartment of said platform end, while seated and remaining seated to complete a specified work activity without undue effort so as to avoid back injury or discomfort, and further whereby said supporting means provides rolling movement of said wheeled caddy such that said seated tradesman can easily propel said wheeled caddy along a level surface with his legs and remain seated while rolling along said level surface.

12. The multipurpose tradesman's wheeled caddy as claimed in claim 11, further comprising a handle removably attached to said upper support platform member for easily conveying said wheeled caddy on a ground surface.

13. The multipurpose tradesman's wheeled caddy as claimed in claim 11, further comprising means for mounting said upper support platform member to said lower support platform member, said means for mounting comprising a plurality of upright support members mounted between said upper support platform member and said lower support platform member whereby said upper and said lower support platform members are spaced a predetermined distance apart.

14. The multipurpose tradesman's wheeled caddy as claimed in claim 11, further comprising:

means for mounting said upper support platform member to said lower support platform member, said means for mounting further comprises at least two upright support members mounted between said upper and said lower support platform members at opposing ends of said upper support platform member.

15. The multipurpose tradesman's wheeled caddy as claimed in claim 11, wherein said means for supporting said lower support platform member further comprises a plurality of wheels dispersed underneath said lower support member for conveying said upper and lower support platform members on a ground surface.

* * * * *